United States Patent
Matsubara (10) Patent No.: US 6,175,483 B1
(45) Date of Patent: *Jan. 16, 2001

(54) MULTI-TAP DISTRIBUTION APPARATUS

(75) Inventor: Hiroshi Matsubara, Nisshin (JP)

(73) Assignee: Maspro Denkoh Company, Ltd., Aichi (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/003,737

(22) Filed: Jan. 7, 1998

(51) Int. Cl.[7] ...................................................... H02H 1/00
(52) U.S. Cl. ........................... 361/119; 361/106; 361/824
(58) Field of Search ...................... 361/103, 106, 361/107, 111, 117, 119, 728, 823, 824, 826; 439/572, 528; 455/3.1

(56) References Cited

U.S. PATENT DOCUMENTS 4,850,014 * 7/1989 Gillis et al. .......................... 361/600
5,637,011 * 6/1997 Meyerhoefer et al. ............... 439/409

FOREIGN PATENT DOCUMENTS

| 98585 | 1/1997 | (JP) | ................................. H03H/7/48 |
| 955266 | 2/1997 | (JP) | ............................... H01R/17/04 |

* cited by examiner

Primary Examiner—Ronald W. Leja
(74) Attorney, Agent, or Firm—Pearson & Pearson, LLP (57) ABSTRACT

A multi-tap distribution apparatus is encased in an enclosure comprising a boxed shaped housing (2) with one side open and a main body (1) fitted in the opening of the housing. A pair of operating windows (13) are recessed in the main body for mounting and removing thermistors (14). Four connectors (4) are projected into each operating window through insertion holes (13a) in the bottom surface of the window. The connectors are coupled to a current transmission circuit (18) which feeds distribution output terminals (5) with operating currents. Four thermistors can be detachably coupled to the connectors without opening the enclosure. By coupling and detaching each thermistor, operating currents can be passed and blocked to the corresponding distribution output terminal (5). Each operating window (13) is normally closed up with a cover (3) to keep out rain and external noise.

9 Claims, 10 Drawing Sheets

MULTI-TAP DISTRIBUTION APPARATUS

BACKGROUND OF THE INVENTION

1. Field of the Invention

The present invention relates to a multi-tap distribution apparatus, More particularly, the present invention relates to a multi-tap distribution apparatus which is suitable for use with CATV cables.

2. Description of the Related Art

In a CATV system, transmission cables are aerially strung on, for example, telephone poles or laid underground with a number of multi-tap distribution apparatuses and amplifiers interposed therein at suitable points. Secondary cables are branched out from multi-tap distribution apparatuses to subscribers' homes to distribute signals.

CATV stations transmit not only high-frequency signals, such as television signals and control signals, but also currents for operating amplifiers provided on the main lines and CATV telephones installed at subscribers' homes. Therefore, if a short circuit is caused by inappropriate installation of equipment or tampering by children, excess currents may flow through the cable to cause damage to the equipment installed in the cable.

In order to prevent such accidents, distribution apparatuses are normally provided with circuit-breakers that break the circuitry upon occurrence of a short circuit, One type of device used as a circuit-breaker is a positive thermistor (referred to as "thermistor" hereinafter), Thermistors are provided in series with respective taps (distribution output terminals) in the distribution apparatus' current transmission circuit for feeding the taps with operating currents. Any of the thermistors can interrupt the circuit upon occurrence of a short circuit as the resistance of the thermistor increases with the increase in the amperage of the current.

Where a CATV telephone system is used, each time a subscriber changes the CATV service company or cancels the subscription (which often occurs, especially in the United States), the power to the CATV telephone needs to be switched off and on. As described above, a positive thermistor or other suitable switch device can be installed in the current transmission circuit so that the circuit can be interrupted by operating the switch to stop the current supply to, and thus disable, the CATV telephone or other type of terminal.

Figure 10:
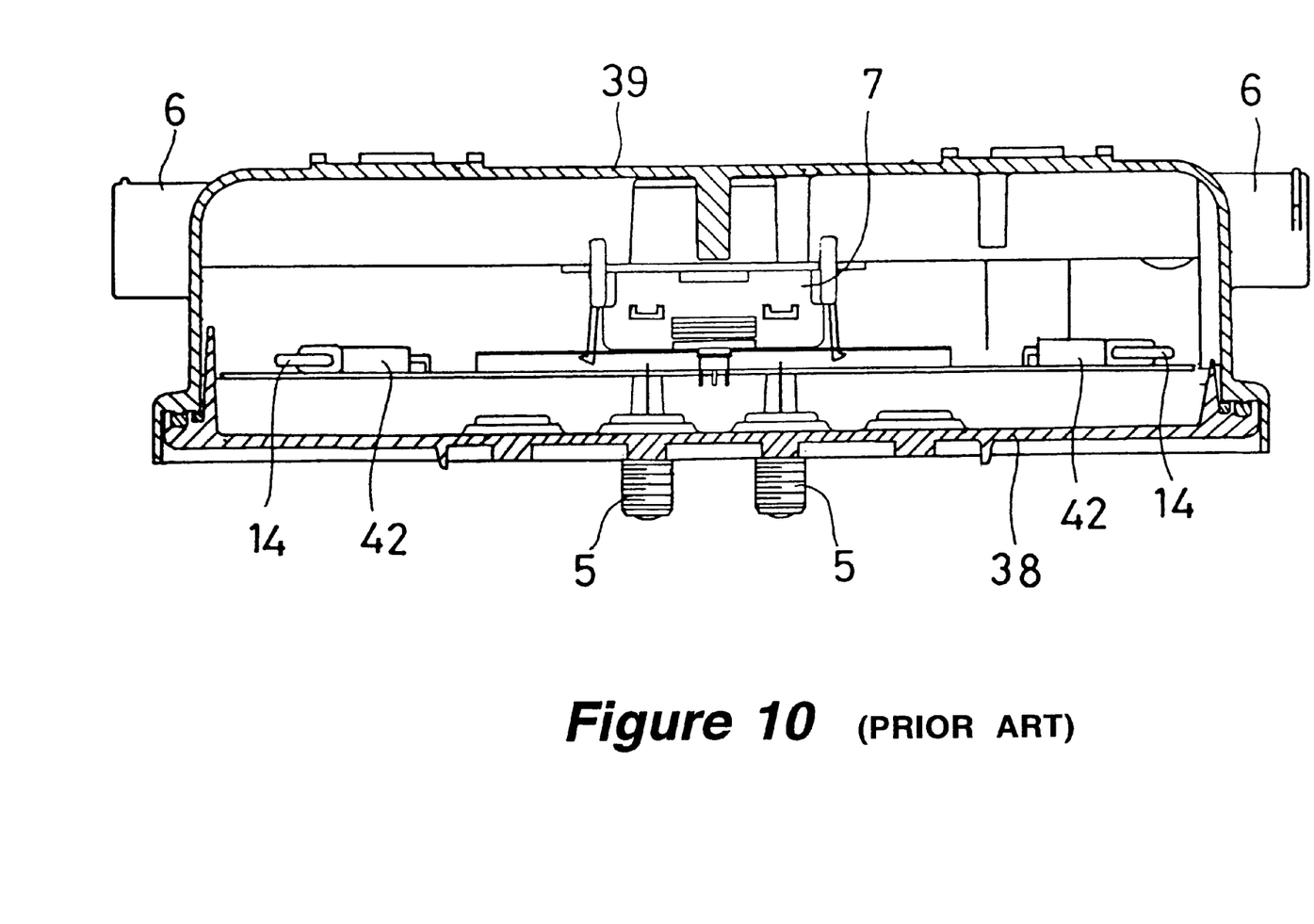
FIG. 10 shows a conventional distribution apparatus for use in a CATV system.

FIG. 10 shows a conventional distribution apparatus used in a CATV system. This apparatus has an enclosure comprising a box-shaped housing 39 with one side open and a main body 38 that includes a plurality of distributing output terminals 5 and fits in the open side of the housing 39. The housing 39 is provided with transmission cable connection terminals 6 for connection to the main line. The apparatus contains a distributing circuit, a current transmission circuit, and a branch unit 7 having a branch circuit therein. Thermistors 14 are mounted as circuit breakers inside the apparatus via connectors 42 as illustrated, so that the distribution apparatus needs to be opened to remove or mount any of the thermistors 14.

Whenever the distribution apparatus needs to be opened to remove or mount the thermistors 14, the shield factor of the main line is reduced to allow external noise to enter the CATV line or to cause leakage of radio waves from the apparatus. Furthermore, since a plurality of subscribers are normally served from a single distribution apparatus, signal transmission to all of the subscribers is interrupted whenever the apparatus is opened. This inconveniences the subscribers as they cannot view the CATV programs or use the CATV telephone services even if only for a short time.

SUMMARY OF THE INVENTION

In view of the above-identified problems, an object of the present invention is to provide an improved distribution apparatus that allows making and breaking of the current transmission circuit to a specific subscriber without opening the apparatus so as not to inconvenience other subscribers served by the same distribution apparatus.

Another object of the present invention is to provide an improved distribution apparatus that passes and blocks operating currents to a specific subscriber without affecting the characteristics of the signals carried on the main line.

The above objects and other related objects are realized by providing an improved distribution apparatus for being interposed in a transmission cable. The distribution apparatus is encased in an enclosure including a box-shaped housing with one side open and a main body closing up the open side of the housing. The housing is provided with portions for connecting with the transmission cable. The distribution apparatus further includes: a modularized branch circuit detachably mounted in the enclosure; a plurality of distribution output terminals provided on the main body, for distributing signals received from the transmission cable via the branch circuit; a current transmission circuit provided between the distribution output terminals and the transmission cable; at least one operating window provided in a wall of the enclosure; and a plurality of switch means interposed in the current transmission circuit so as to pass and block currents to the respective distribution output terminals, The switch means are located in the at least one operating window, thus allowing the switch means to be operated through the at least one window from the outside of the enclosure.

According to one aspect of the present invention, the at least one operating window is formed in the main body. Furthermore, each of the switch means has an operating member and at least one operation hole through which the operating members are exposed in the operating windows is provided within the window. Therefore, only the operating members of the switch means can be operated from the outside of the enclosure.

According to another aspect of the present invention, the operating member of each switch means is an operating lever.

According to still another aspect of the present invention, connectors are placed in the current transmission circuit and the switch means are positive thermistors which are detachably mounted in the current transmission circuit via the connectors.

According to yet another aspect of the present invention, the at least one operating window is provided with a cover for sealing the at least one operating window.

In accordance with another aspect of the present invention, the cover of the at least one operating window is hinged along one edge thereof on the main body.

BRIEF DESCRIPTION OF THE DRAWINGS

For a fuller understanding of the nature and objects of the present invention, reference should be made to the following detailed description and the accompanying drawings, in which.

DETAILED DESCRIPTION OF THE PREFERRED EMBODIMENTS

Figure 1:
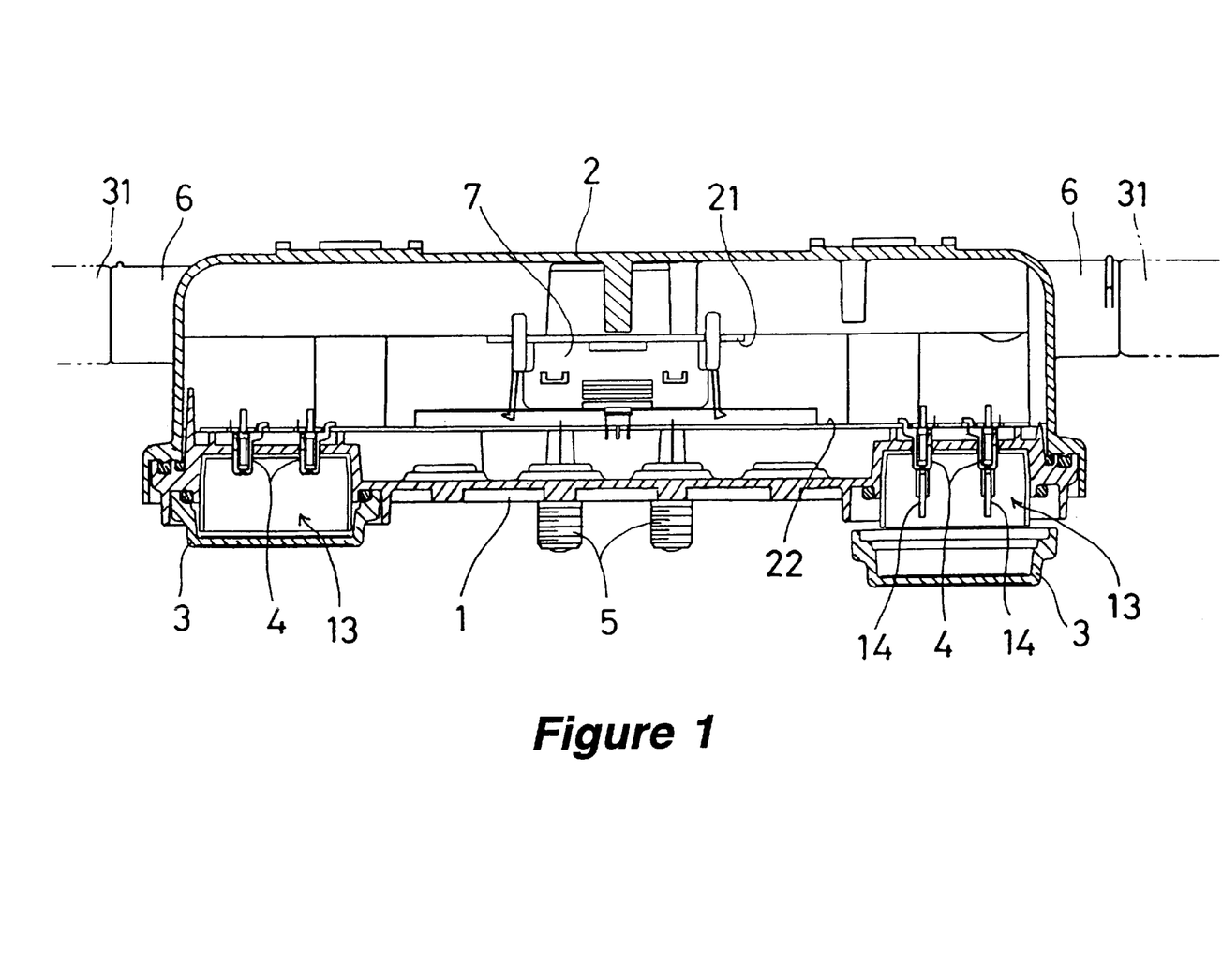
FIG. 1 is a cross sectional view of a distribution apparatus embodying the present invention.
Figure 2:
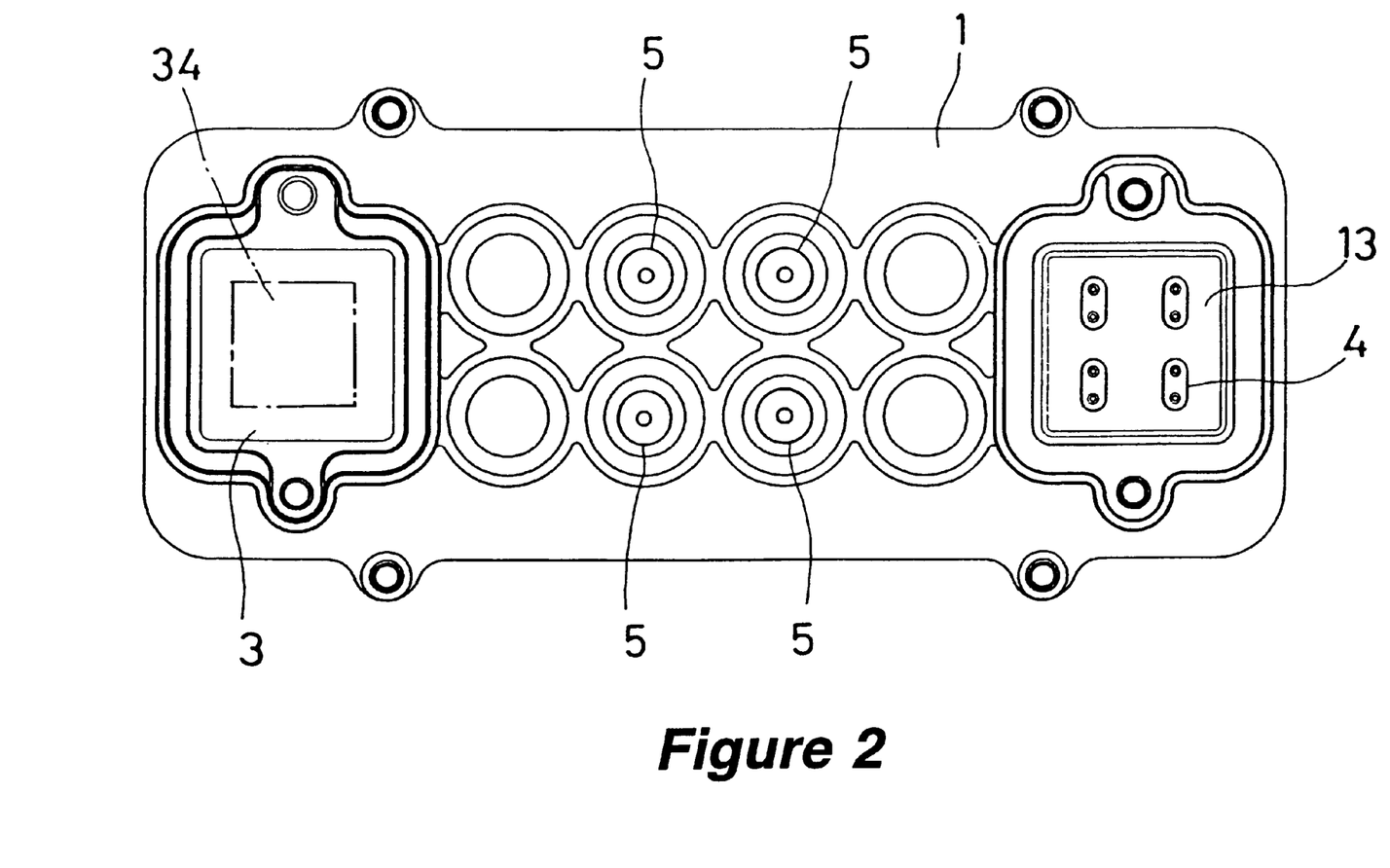
FIG. 2 is a front view (when used as a pedestal type device) of the distribution apparatus of FIG. 1.

An embodiment of the present invention is explained hereinafter with specific reference to the attached drawings. FIG. 1 is a cross section of a distribution apparatus while FIG. 2 is a front view (when used as a pedestal type device) of the distribution apparatus.

Figure 3A:
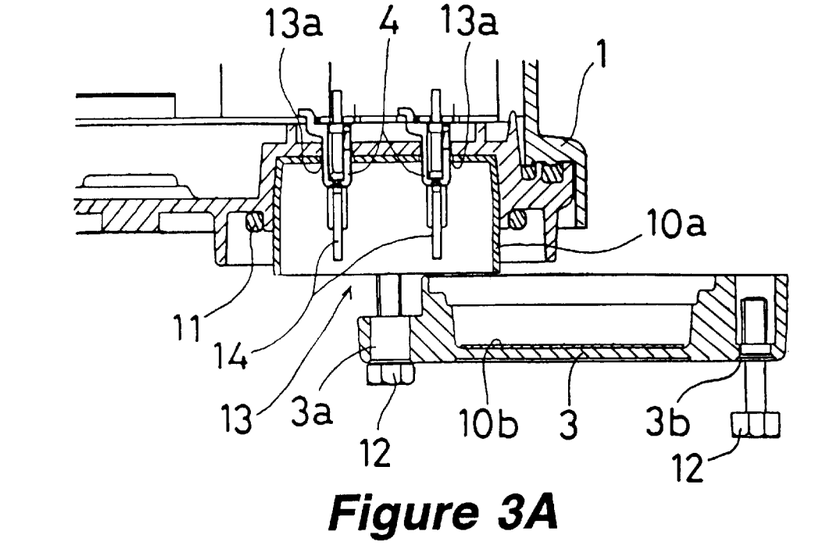
FIG. 3A is a cross sectional view of an operating window of the distribution apparatus of FIG. 1 with its cover removed therefrom.
Figure 3B:
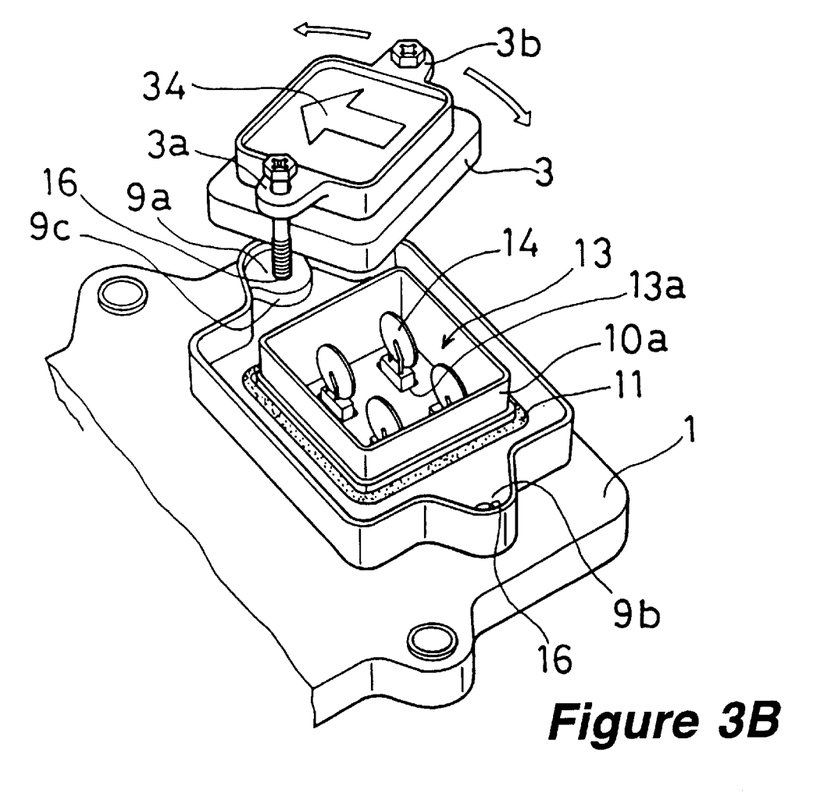
FIG. 3B is a perspective view of the operating window also with its cover removed therefrom.

As illustrated, the distribution apparatus has a die-cast aluminum enclosure comprising a box-shaped housing 2 with one side open and a board-shaped main body 1 fitted in the open side of the housing 2. Disposed inside the distribution apparatus is a mother board 21 having a circuit for separating the high-frequency signals from operating currents both received from the main line cable and feeding the separated high-frequency signals to a branch circuit of the apparatus. Also disposed inside are a branch unit 7 modularizing the above-mentioned branch circuit and a tap board 22 including a circuit for dividing the signals received from the branch unit 7, mixing the divided signals with the operating currents that were previously separated, and distributing the signals mixed with the currents With specific reference to FIG. 2, the main body 1 is designed to accommodate up to eight distributing output terminals (or external taps) 5: in this example, four distributing output terminals 5 are mounted in one of the operating windows 13 as shown in FIGS. 1 and 3A–B. Referring again to FIG. 1, numeral 6 designates transmission cable connection terminals for coupling main line cables (transmission cables) 31 to the distribution apparatus.

A pair of operating windows 13 are recessed at the ends of the main body 1. As best shown in FIGS. 1 and 3A–B, thermistors 14 can be removably mounted on the tap board 22 of the main body 1 via connectors 4 in the window 13. Reference numeral a designates covers for the operating windows 13. FIG. 2 shows the left operating windows 13 shut with the cover 3 and the other window 13 with the cover 3 and the thermistors 14 removed. The covers 3 can be made of, for example, synthetic resin. However, more preferred materials, in terms of shield factor against electromagnetic waves, include die-cast aluminum, die-cast zinc, and other suitable metals.

A maximum of four connectors can be mounted on the tap board 22 of the main body 1 through each window 13 so as to correspond to the number of the distributing output terminals 5 mounted. In this embodiment, four connectors are mounted in one of the operating windows 12 (the right window in FIG. 1) since as many distributing output terminals 5 are provided in the tap board 21.

Referring to FIGS. 3A and 3B, four insertion holes 13a are formed in the bottom surface of each of the operating windows 13 to insert the connectors 4 therethrough. The holes 13a are only slightly larger than the connectors 4. The operating windows 13 are recessed to mount the connectors 4 on the tap board 22. The purpose of this design is to minimize the communication between the inside and the outside of the distribution apparatus so as to enhance the closure of the apparatus. Alternatively. the bottom of each widow 13 may be removed to have one large opening, instead of four small holes, to install the connectors 4. However, to shield the distribution apparatus against rain or external electromagnetic waves, small openings are more preferable as in the design according to this embodiment.

By removably mounting the thermistors 14 as described above, the thermistors can be used as power switches; the operating currents can be selectively fed and interrupted to each distributing output terminal 5 by mounting and removing the corresponding thermistor 4. Moreover, the operating windows 13 allow the thermistor 14 for a specific subscriber to be mounted and removed without opening the distributing apparatus, so that the other subscribers served from the same apparatus are not inconvenienced during this operation, FIGS. 3A and 3B are more detailed illustrations of the operating window 13. Particularly, FIG. 3A shows a cross section of the operating window 18 with its cover 3 removed and FIG. 3B is a perspective view of the operating window 13 also with its cover 3 removed. As illustrated, the inner walls and the bottom surface of each operating window 13 is covered with insulating walls 10a while the ceiling of the cover 3 is covered with an insulating sheet 10b. A preferred material for the insulating walls 10a is a heat-resistant ABS resin and a preferred material for the insulating sheet 10b is a PVC resin. Those with an ordinary skill in the art will understand that other insulating resins than the above-mentioned resins can be also used.

In addition, a square waterproof gasket made of, for example, silicon rubber is provided in the operating window 13 where the cover 3 abuts on the window in order to keep out rain, A pair of tabs 3a and 3b with a bolt insertion hole is formed on each cover's two opposite sides extending in parallel to the longitudinal sides of the main body 1. A pair of bolt tightening portions 9a and 9b corresponding to the bolt insertion tabs 3a and 3b is formed across each operating window 13. Each bolt tightening portion is provided with a threaded hole 16 so that a pair of bolts 12 can be inserted through the tabs 3a and 3b and tightened into the bolt tightening portions in order to secure the cover 3 on the main body 1.

As shown in FIG. 2, the tab 3a and the bolt tightening portion 9a are made wider than the tab 3b and the bolt tightening portion 9b to prevent the cover 3 from being mounted in the reverse position.

Referring to FIGS. 3A and 3B, each pair of bolt insertion tabs 3a and 3b is formed asymmetrically as is each pair of bolt tightening portions 9a and 9b; i.e., each bolt tightening portion 9a is provided with a step 9c so that the cover 3 can be opened only by loosening the corresponding bolt 12. More particularly, to open the cover 3, the bolt 12 tightened in the bolt tightening portion 9b is removed therefrom while the other bolt 12 is loosened without being removed from the bolt tightening portion 9a. Since the cover 3 can be rotated on the loosened bolt 12 as shown in FIG. 3B, the cover need not be detached from the main body 1 when operating the thermistors. This structure allows the thermistors 14 to be coupled to, and removed from, the connectors without detaching the cover 3 from the operating window. This structure also prevents the cover 3 from being dropped when the distribution apparatus is being installed in the air as an aerial type device.

Furthermore, the hole in the bolt insertion tab 3b is a threaded hole that can engage the bolt 12. This prevents the bolt 12 from easily slipping out of the cover 3 and being lost when it is removed from the main body 1, Preferably, the bolt 12 is provided only with threads in the top portions and also provided with an appropriate means to prevent the bolt from slipping out of the holes.

As shown in FIG. 3B, the top surface 34 of the cover 3 can be used as a space to indicate various signs, such as the illustrated arrow that indicates the direction of the signals carried on the main line, and/or information, such as the combined losses, that may be useful to the operator in his/her switching or maintenance work.

Figure 4A:
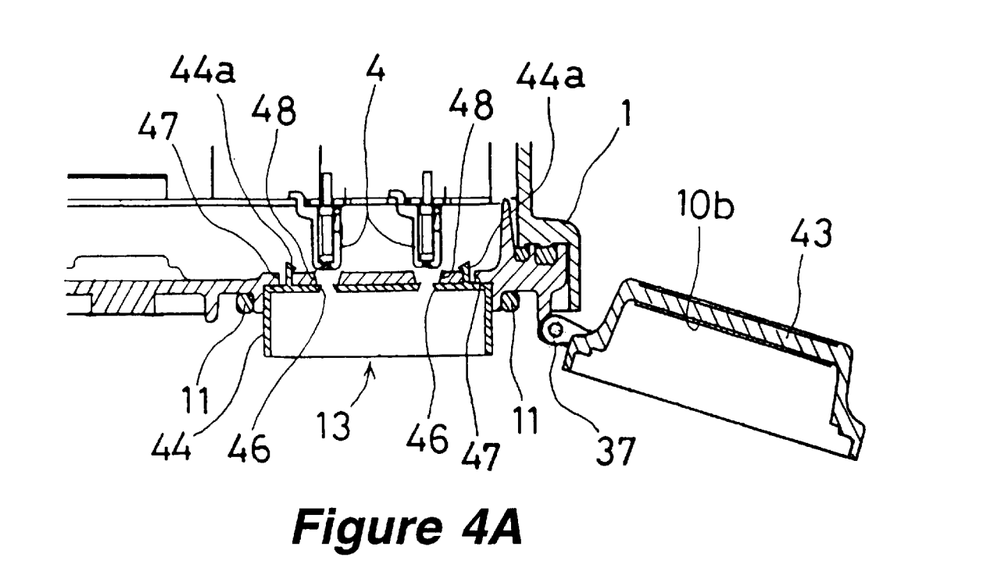
FIG. 4A is a cross sectional view of an alternative operating window with its cover opened.
Figure 4B:
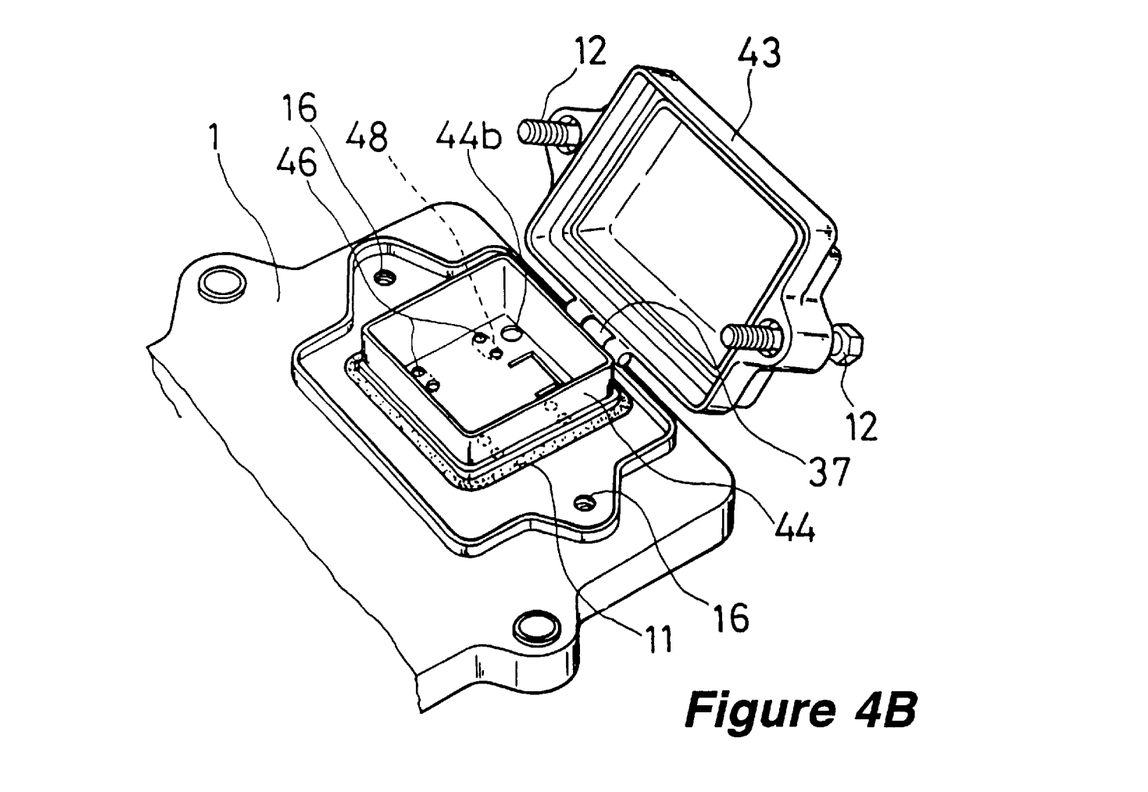
FIG. 4B is a perspective view of the operating window of FIG. 4A also with its cover opened.

FIGS. 4A and 4B show an alternative embodiment of the operating window. This embodiment differs from the previous embodiment mainly in the opening-and-closing mechanism of the cover and the structure of the bottom surface of the window recess.

Each cover 43 is connected to the main body 1 with a hinge 43 provided along the respective end of the main body 1, so that the cover 43 does not fall when the bolts 12 are removed from the window 13. Also in this embodiment, each recessed window 13 is not as deeply recessed as in the previous embodiment, so that the connectors 4 do not penetrate the bottom surface. In this arrangement, the connection terminals of the thermistors 14 (not shown in FIGS. 4A and 4B) are coupled from the outside to the connectors 4 via connection holes 48 in the bottom surface of the window 13. Preferably, the bolts 12 are provided with an appropriate means to prevent the bolts from slipping out of the holes as in the previous embodiment.

The hinge structure of this embodiment offers the advantages that the cover 43 does not have to be detached from the main body 1 when opened. In addition, the relatively shallow recess window 13 leaves more space inside the distribution apparatus.

Moreover, as shown in FIG. 4A, the insulating walls 44 are made in a shape of a box having two claws inserted through two corresponding engaging holes 47 provided in the bottom surface of the operating window 13 so that the claws engage the main body 1 on the holes 47. Reference number 46 designates pairs of guide holes for guiding the connection terminals of the thermistors 14 to the connecting holes of the connectors 4 via the holes 48. To facilitate the connection 4 of the thermistors 14 to the connectors, the inner diameter of each guide hole 46 is made gradually smaller toward the connector 4. In addition, to allow secure connection and removal of the thermistors 14 without causing a short circuit, the diameter of each guide hole 46 is made smaller than the connection holes 48 so as to allow only the corresponding connector terminal of the thermistor 14 to be inserted therethrough. By providing the insulating walls 44 in this matter, the sealing of the operating window is further enhanced. Reference numeral 44b designates indicator openings for confirming the distributing terminal numbers marked adjacent to the respective connection holes 48.

Figure 5:
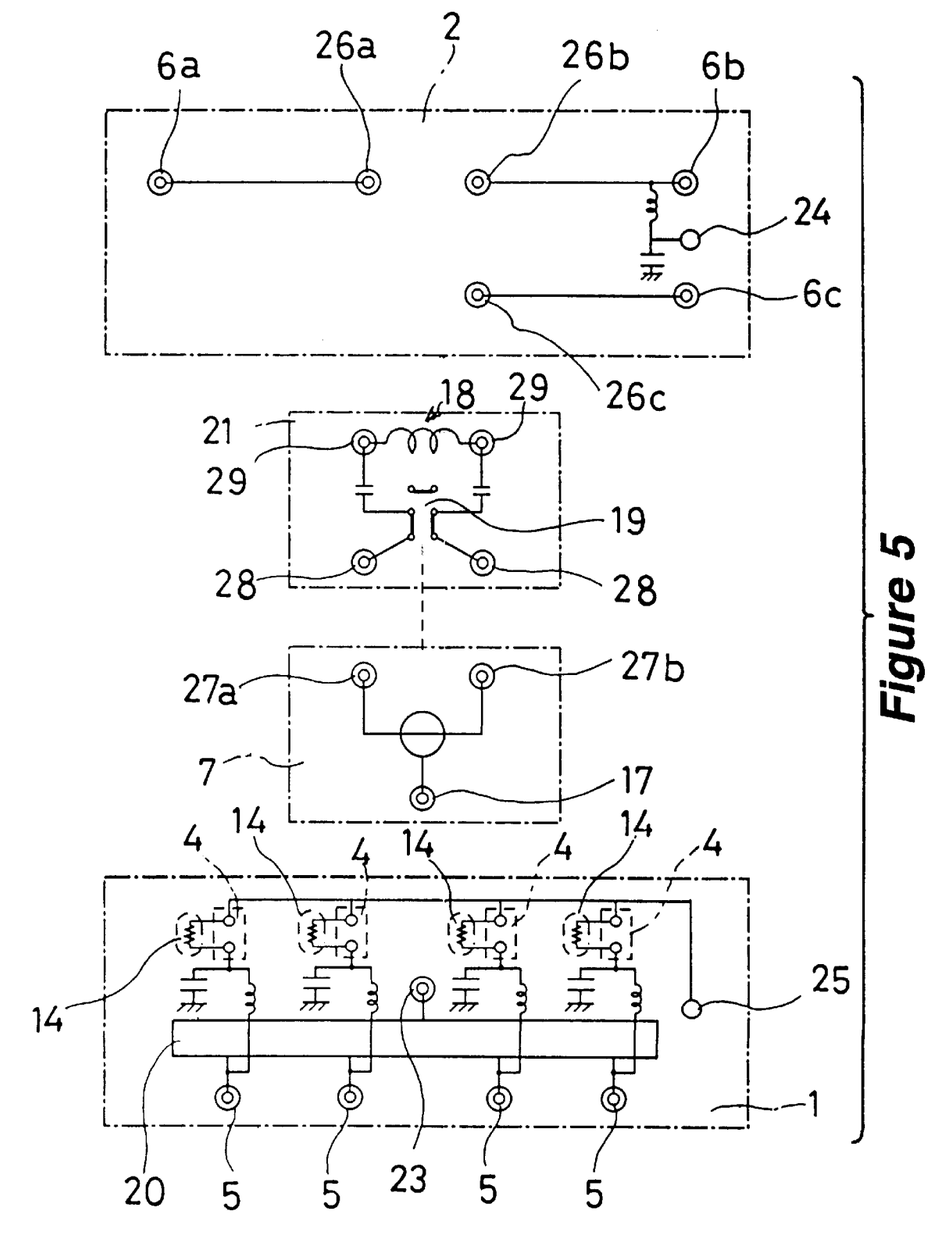
FIG. 5 shows the circuit diagram of the distribution apparatus of FIG. 1.
Figure 6:
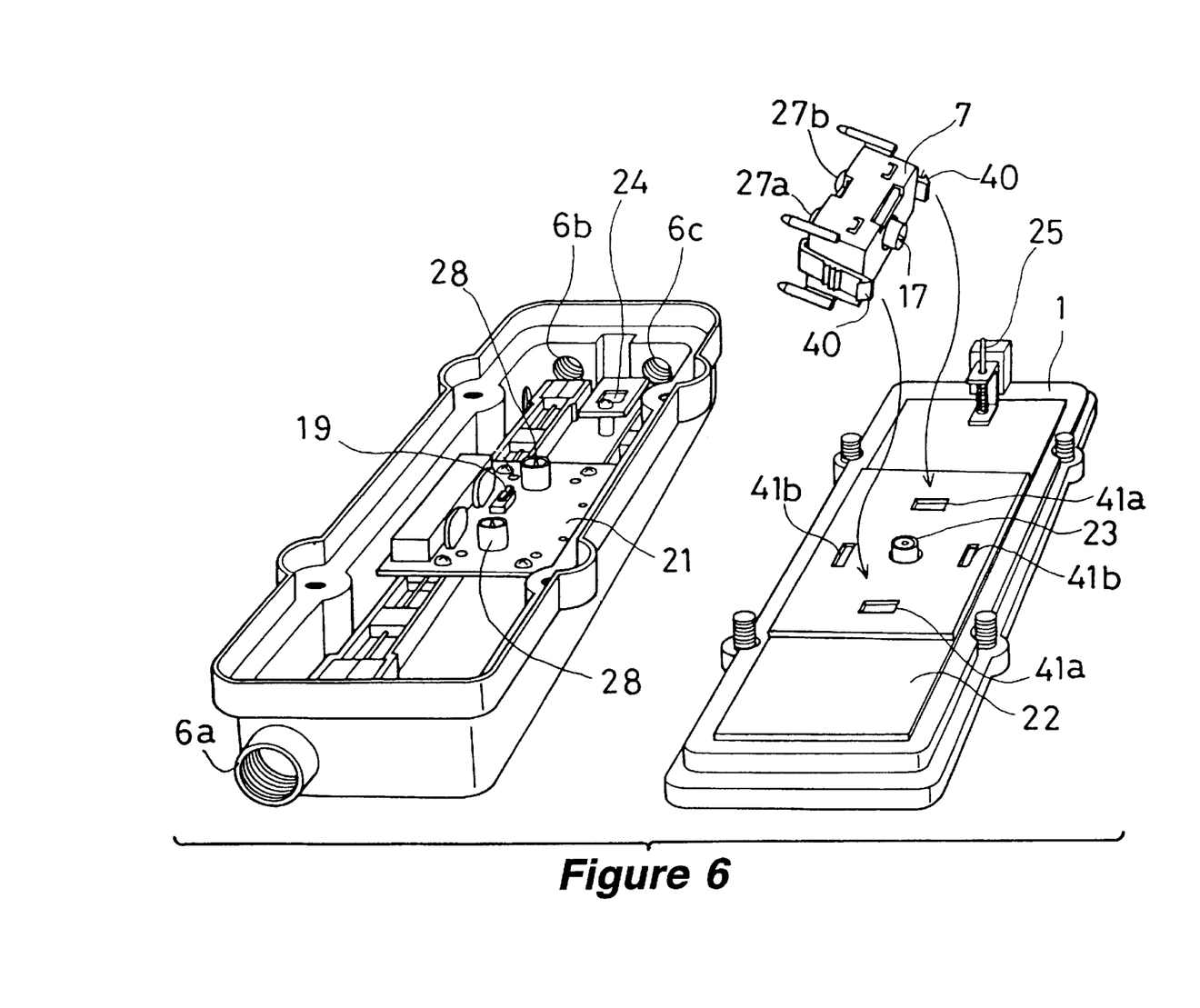
FIG. 6 is an exploded view of the distribution apparatus of FIG. 1.

Referring to the circuit diagram of FIG. 6 and the perspective view of FIG. 6, the circuitry of the distribution apparatus is explained hereinafter In FIG. 5, the circuits of the units constituting the entire apparatus are shown separately. The box-shaped housing 2 is provided with transmission cable connection terminals 6a, 6b, and 6c, Reference numeral 24 denotes a first current passage contact for feeding the main body 1 with operating currents. Additionally, reference numerals 26a, 26b, and 26c denote main line connection terminals for connection to the mother board 21.

The mother board 21 is provided with a current transmission circuit 18 for allowing operating currents to flow between the input and the output of the main line. Reference numeral 29 denotes a pair of transmission terminals connected with the circuitry of the housing 2 while reference numeral 19 denotes a push switch which operates in response to the mounting and removal of the branch unit 7. Numeral 28 indicates a pair of relay terminals through which high-frequency signals can be transmitted to the branch unit 7.

The branch unit 7 has a built-in branch circuit and is detachably mounted on the main body 1. Depending on the direction of the signals carried on the main line and the position of the relay terminals 28, the branch unit 7 can be mounted on the main body in different positions and orientations (discussed later in further detail). Reference numeral 27a denotes an input connection terminal while numeral 27b denotes an output connection terminal. Reference numeral 17 is a branch terminal for branching the output to the main body 1. The branch unit 7 is also provided with a pair of engaging claws 40 for engaging either a first pair of slits 41a or a second pair of slits 41b provided in the main body 1 so as to mount the branch unit on the main body.

The main body 1 is provided with a distributor 20, an input terminal 23 connected with the branch circuit 7, and four distributing output terminals 5 (external taps). Therefore, the distributor 20 divides the signals received at the input terminal 23 into four outputs. Reference numeral 25 denotes a second current passage contact for receiving operating currents from the first current passage contact 24 of the housing 2.

Figure 7:
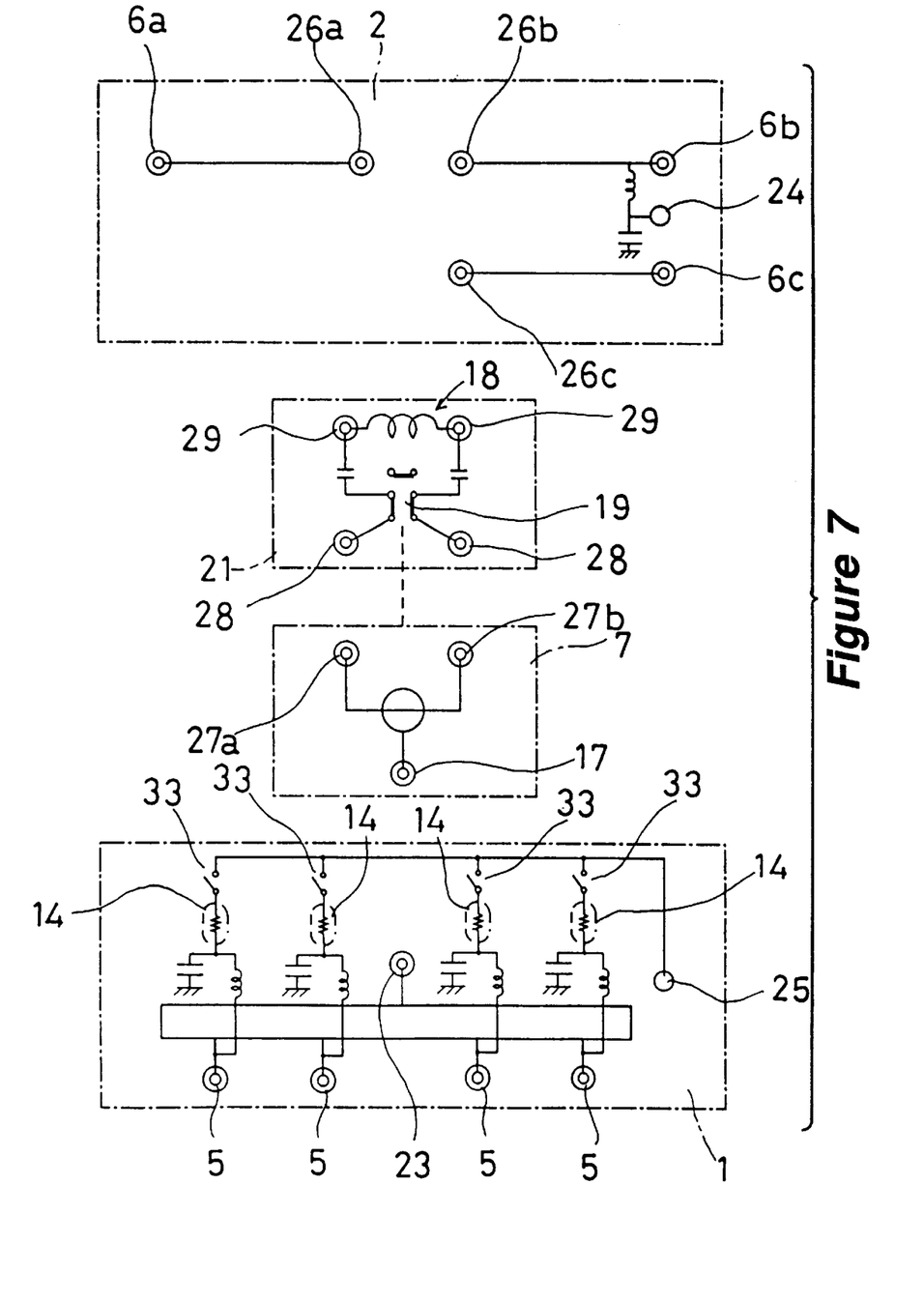
FIG. 7 shows another embodiment of the circuitry of the distribution apparatus.

FIG. 7 illustrates another embodiment of the circuitry of the distribution apparatus. The current transmission circuit of the embodiment has a different switching mechanism from that of the above-described embodiment. More particularly, the thermistors 14 are directly interposed in the current transmission circuit of the tap board 22, instead of being provided via connectors. In this embodiment, the current transmission circuit is made and broken by operating switches 33 placed in series with, and adjacent to, the respective thermistors 14. Only the operating levers (not shown) of the switches 33 are exposed in the window for operation from the outside. It is easier to make and break the current transmission circuit in this embodiment than in the previous embodiment although the switches 33 need to be additionally provided. As a further advantage, if water-proof type switches are employed, the covers can be omitted.

The installation and operation of the distribution apparatus will be explained with reference to FIGS. 8A–C and 9A–B.

The branch unit 7 can be mounted in different positions with respect to the housing 2 and the mother board 21, depending on the application as mentioned above. To employ the distribution apparatus as an aerial type device, it is more convenient to use the transmission cable connection terminals 6a and 6b (the terminals provided on the opposing sides of the distribution apparatus), with one of the terminals functioning as the input of the main line and the other as the output. In the aerial application, when the mother board 21 is mounted in the housing 2, the transmission terminals 29 of the mother board are coupled to the main line connection terminals 26a and 26b, so that the current transmission circuit 18 connects the two terminals 26a and 26b. The branch unit 7 is then mounted on the mother board 21 as shown in either FIGS. 8A or 8B, depending on the direction of the signal transmission (indicated by the illustrated arrows).

Figure 8A:
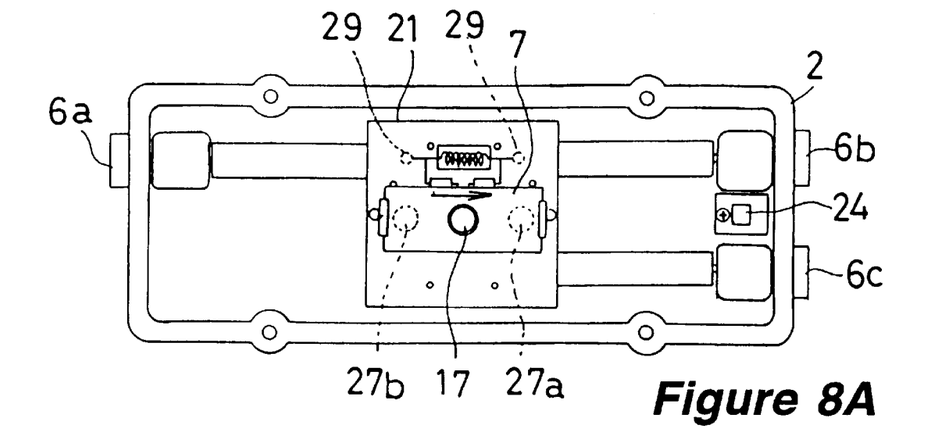
FIGS. 8A–C show different pairs of transmission cable connection terminals used as the input and output terminals for the transmission cable.
Figure 8B:
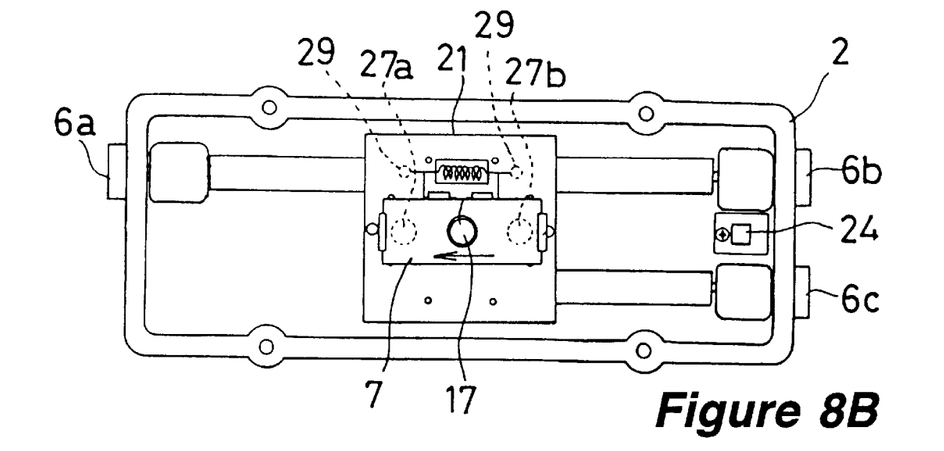
Figure 8C:
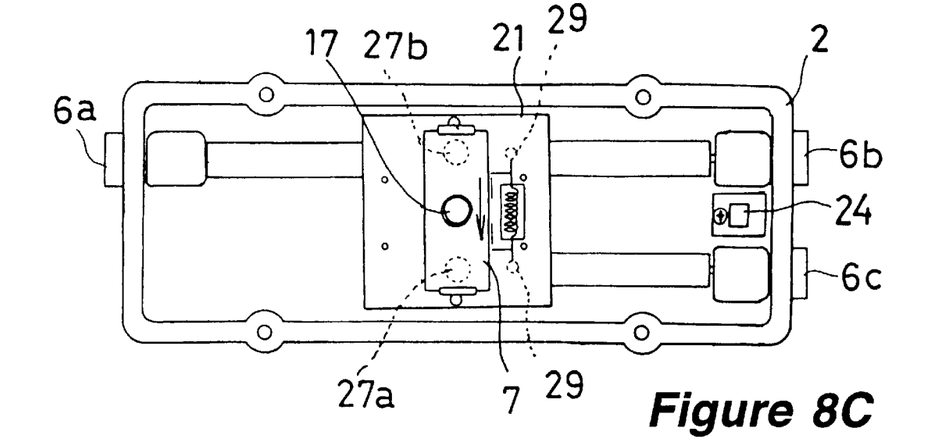

To employ the distribution apparatus as a pedestal type device, it is more convenient to use the transmission cable connection terminals 6b and 6c (the terminals provided on one of the two sides of the distribution apparatus), with one of the terminals functioning as the input of the main line and the other as the output. In this application, the mother board 21 is installed so that the current transmission circuit 18 connects the two terminals 6b and 6c. The branch unit 7 is mounted on the mother board 21, for example, as shown in FIG. 8C. To reverse the position of the input and output terminals, the branch unit 7 is removed, rotated 180 degrees, and mounted back on the mother board 21 (not shown), In order to change the number of distribution outputs (external taps), the main body 81, as it incorporates the tap board 22, are replaced with a different main body incorporating a tap board having a desired number of distribution output terminals. The amplifier (not shown) placed upstream from the distribution apparatus can be used to change or adjust the output level at the distribution output terminals (this adjustment is required when changing the number of distribution output terminals). Alternatively, since the branch unit 7 can be manufactured to have different levels of combined loss, it suffices to replace the currently installed branch unit 7 with one having an appropriate combined loss. If branch units having combined losses of, for example, 4, 7, 10, 13, 16 dB have been prepared, the output level at the distribution output terminals can be readily changed by selecting the one with the desired level. This would eliminate the need for adjusting the amplifier.

Figure 9A:
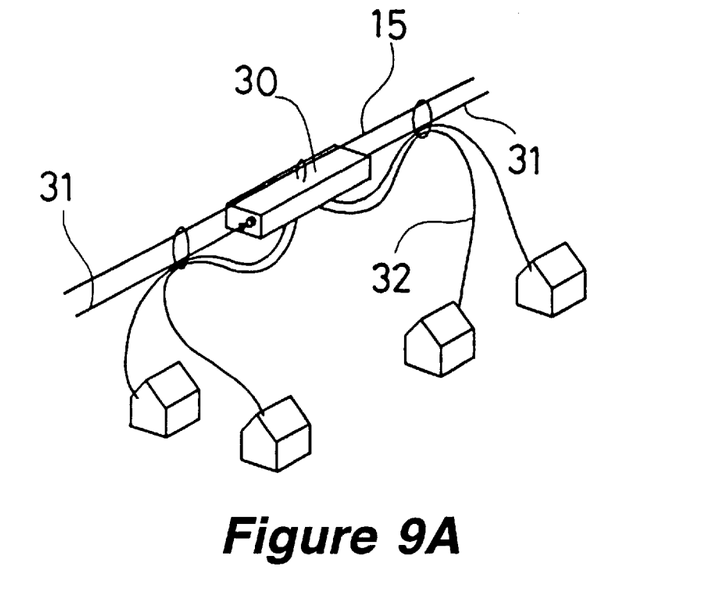
FIG. 9A shows the distribution apparatus interposed in a CATV cable as an aerial device and FIG. 9B shows the distribution apparatus interposed in a CATV cable as pedestal device.
Figure 9B:
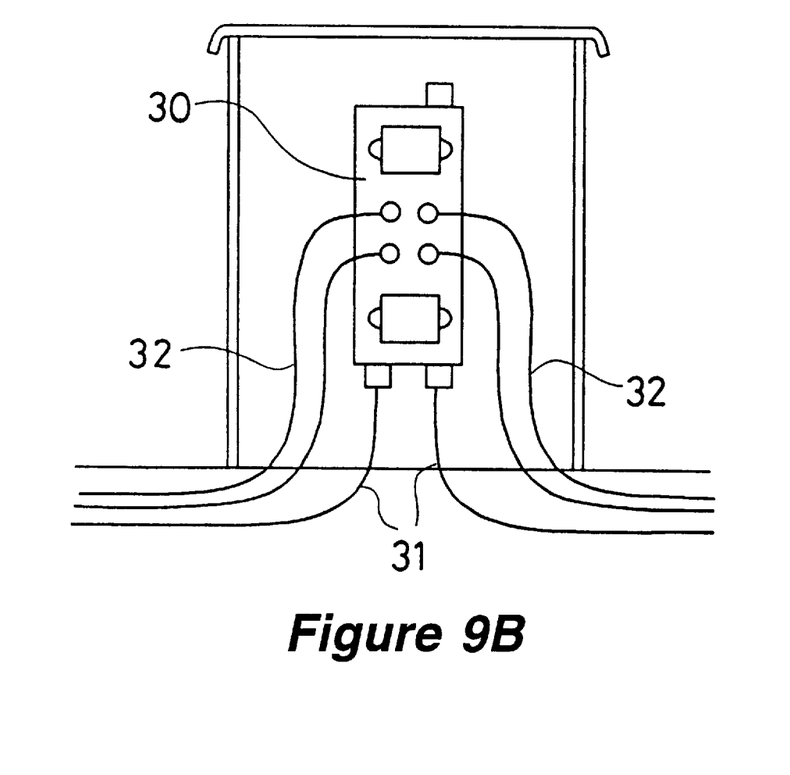

FIG. 9A shows the distribution apparatus of the present invention used as an aerial device while FIG. 9B shows the distribution apparatus used as a pedestal device. In the aerial application, the distribution apparatuses are interposed in the main line cable 31 strung on suitable means, such as telephone poles, with a messenger wire 15. In the pedestal application, the main line cable 31 is laid underground with the distribution apparatuses interposed therein at suitable points. In either application, coaxial branch cables (secondary cables) 32 are connected to subscribers' homes from the distribution apparatus.

In the above embodiments, although the operating windows 13 are formed at the two ends of the main body 1, they both can be provided near one end. Furthermore, instead of providing two windows, one may be formed in the central position of the main body. The operating windows can be even provided in the opposite surface (the housing 2) of the distribution apparatus.

As any number of further modifications, alterations, and changes are possible without departing from the scope or spirit of the essential characteristics of the present invention, it is to be understood that the above embodiment is only an illustration and not restrictive in any sense. The scope or spirit of the present invention is limited only by the terms of the appended claims,

What is claimed is:

1. A distribution apparatus for being interposed in a transmission cable, said distribution apparatus comprising:
    an enclosure including a box-shaped housing with one side open and a main body closing up the open side of the housing, the housing having portions for connecting with the transmission cable;
    a modularized branch circuit detachably mounted in the enclosure;
    a plurality of distribution output terminals provided on the main body, for distributing signals received from the transmission cable via the branch circuit;
    a current transmission circuit provided between the distribution output terminals and the transmission cable;
    at least one operating window provided in a wall of the enclosure, said operating window comprises insulated surfaces and a cover for sealing said operating window;
    a plurality of removable switch means interposed in the current transmission circuit so as to pass and block currents to the respective distribution output terminals, the removable switch means being located in the at least one operating window, thus allowing the removable switch means to be operated through the at least one window from the outside of the enclosure;
    said cover comprising first and second opposite tabs with threaded holes for receiving a bolt and preventing said bolt from slipping out of said tabs;
    first means and second means for tightening a pair of bolts positioned on opposite sides of said operating window, said first means and said second means being aligned under said first and said second opposite tabs;
    said pair of bolts inserted through said first tab and said second tab for securing said cover to said main body; and
    said cover being rotatable around one of said pairs of bolts when the other one of said pair of bolts is removed thereby providing access to said operating window.

2. A distribution apparatus in accordance with claim 1, wherein the at least one operating window is formed in the main body, and further, wherein each of the removable switch means has an operating member, and at least one operation hole, through which the operating member is exposed in the operating window, is provided within the window so as to allow only the operating member of the switch means to be operated from the outside of the enclosure to prevent degrading of said signals to subscribers.

3. A distribution apparatus in accordance with claim 2, wherein the operating member of each removable switch means is an operating lever.

4. A switch means distribution apparatus in accordance with claim 2, wherein the removable switch means are positive thermistors detachably mounted in the current transmission circuit via connectors.

5. The distribution apparatus in accordance with claim 1 wherein said first tab and said first tightening means are wider than said second tab and said second tightening means to prevent said cover from being mounted in a reverse position.

6. A distribution apparatus for being interposed in a transmission cable, said distribution apparatus comprising:

an enclosure including a box-shaped housing with one side open and a main body closing up the open side of the housing, the housing having portions for connecting with the transmission cable;

a modularized branch circuit detachably mounted in the enclosure;

a plurality of distribution output terminals provided on the main body, for distributing signals received from the transmission cable via the branch circuit;

a current transmission circuit provided between the distribution output terminals and the transmission cable;

at least one operating window provided in a wall of the enclosure, said operating window comprises insulated surfaces and a cover for sealing said operating window;

a plurality of removable switch means interposed in the current transmission circuit so as to pass and block currents to the respective distribution output terminals, the removable switch means being located in the at least one operating window, thus allowing the removable switch means to be operated through the at least one window from the outside of the enclosure;

said cover of the at least one operating window comprises a hinge along one edge thereof on said main body and comprises first and second opposite tabs, each tab having a threaded hole for receiving a bolt and preventing said bolt from slipping out of said tabs;

means for tightening said bolt, positioned on opposite sides of said operating window and aligned under said first and second opposite tabs; and a pair of bolts inserted through said first tab and said second tab for securing said cover to said main body.

7. Distribution apparatus in accordance with claim 6, wherein the at least one operating window is formed in the main body, and further, wherein each of the removable switch means has an operating member, and at least one operation hole, through which the operating member is exposed in the operating window, is provided within the window so as to allow only the operating member of the switch means to be operated from the outside of the enclosure to prevent degrading of said signals to subscribers.

8. A distribution apparatus in accordance with claim 7, wherein the operating member of each removable switch means is an operating lever.

9. A switch means distribution apparatus in accordance with claim 6, wherein the removable switch means are positive thermistors detachably mounted in the current transmission circuit via connectors.

* * * * *